United States Patent [19]

Van Kirk et al.

[11] Patent Number: 4,811,760
[45] Date of Patent: Mar. 14, 1989

[54] MULTIPLE CONDUCTOR FLUID HANDLING DUCT FOR AN AUTOMOTIVE VEHICLE

[75] Inventors: Larry J. Van Kirk, Saline; Ronald L. Waterloo, Ann Arbor, both of Mich.

[73] Assignee: Ford Motor Company, Dearborn, Mich.

[21] Appl. No.: 141,231

[22] Filed: Jan. 6, 1988

Related U.S. Application Data

[62] Division of Ser. No. 925,040, Oct. 30, 1986.

[51] Int. Cl.⁴ .................. F16L 11/12; F16L 55/00
[52] U.S. Cl. ........................ 138/115; 138/92; 138/111; 138/157; 138/158; 138/171; 156/73.5; 98/2
[58] Field of Search ............ 138/92, 114, 115, 116, 138/117, 155, 178, DIG. 8, 177, 157, 158, 156, 170, 171, 111; 156/73.5; 98/2, DIG. 7; 174/68 C, 72 R, 95, 98, 101; 285/177, 423

[56] References Cited

U.S. PATENT DOCUMENTS

| | | | |
|---|---|---|---|
| 2,301,512 | 11/1942 | Breese | 98/2.16 |
| 2,651,986 | 9/1953 | Greig | 98/2 |
| 2,902,838 | 9/1959 | Nichols | 62/244 |
| 3,002,871 | 10/1961 | Tram et al. | 156/73.2 |
| 3,456,572 | 7/1969 | Beyer et al. | 98/2 |
| 3,847,184 | 11/1974 | God | 138/DIG. 8 |
| 4,305,988 | 12/1915 | Kocher | 428/158 |
| 4,333,978 | 6/1982 | Kocher | 428/158 |
| 4,377,428 | 3/1983 | Toth | 156/73.5 |
| 4,391,465 | 7/1983 | Piano | 296/208 |
| 4,518,018 | 5/1985 | Kutnyak et al. | 138/DIG. 8 |
| 4,522,114 | 6/1985 | Matsuno | 138/178 X |
| 4,559,868 | 12/1985 | Nonaka et al. | 98/2.08 |

FOREIGN PATENT DOCUMENTS

| | | |
|---|---|---|
| 2319992 | 11/1974 | Fed. Rep. of Germany . |
| 16276 | 9/1966 | Japan . |
| 3823 | of 1901 | United Kingdom ............. 138/115 |
| 969959 | 9/1964 | United Kingdom . |

*Primary Examiner*—James E. Bryant, III
*Attorney, Agent, or Firm*—Jerome R. Drouillard; Roger L. May

[57] ABSTRACT

A fluid handling duct for an automotive vehicle has a channel section having a base and integral, upstanding interior and exterior wall elements and a closure cap which is friction welded to each of the wall elements. The closure cap has several V-shaped projections depending therefrom which are sized such that during friction welding according to the method disclosed herein the wall elements contacted by each of the V-shaped projections will be deflected in a direction transverse to the longitudinal axis of the duct whereby the V-shaped projection and a corresponding wall will be held together with a force of deflection having sufficient magnitude to cause welding of the V-shaped projection to the wall when the closure cap is moved relative to the channel section during friction welding.

5 Claims, 3 Drawing Sheets

MULTIPLE CONDUCTOR FLUID HANDLING DUCT FOR AN AUTOMOTIVE VEHICLE

This is a division of application Ser. No. 925,040, filed Oct. 30, 1986.

BACKGROUND OF THE INVENTION

1. Field of the Invention

This invention relates to a multiple conductor fluid handling duct for an automotive vehicle.

2. Disclosure Information

Automotive vehicles typically include equipment for air conditioning and heating their passenger compartments. Air conditioning systems usually comprise an engine driven compressor having one or more evaporator cores coupled thereto and associated duct work for conducting air past the evaporator core so as to chill and dehumidify the air. In similar fashion, heating systems utilize a heater core through which engine coolant passes as part of an accompanying ducting system. Air conditioning and heating duct work may be either combined or separated depending upon the design of the particular system. Another feature which may be incorporated is that of a fresh air inlet capable of mixing outside air with either the heated or chilled air, as desired by the vehicle operator. Early examples of fluid handling duct work for automotive vehicles are shown in U.S. Pat. Nos. 2,301,512 and 2,651,986.

The concept of a divided flow duct is shown generally in U.S. Pat. No. 2,902,838 in which a refrigerated fluid chills air which can selectively be passed through a cold storage compartment or to a register and into the passenger compartment.

The designers of air conditioning systems have used several types of channel means for ducting conditioned air about the interior of automobile passenger compartments. For example, U.S. Pat. No. 3,456,572 discloses a dash panel assembly including a rigid panel having a resilient crash padding mounted over its surface and defining a single fluid channel circumscribed by the padding, a rigid portion of the structure and further by foam insulation incorporated therein.

U.S. Pat. Nos. 4,391,465 and 4,559,868 disclose multiple channel air handling ducts. Although each of these designs provides means for conducting fluid through more than one channel through the duct, each suffers from a common disadvantage inasmuch as the components of the duct are joined at least in part by bolted or riveted fasteners. This joining method may be expected to cause problems during the production process because fasteners are sometimes not properly set or, indeed, sometime are not provided at all in their appropriate locations; as a result the duct work will not be joined properly. This deficiency imposes a serious problem because the fluid intended to be conducted through the duct may be lost Of equal importance is the fact that the improperly joined duct will give rise to squeaks and rattles audible by the passengers. This may be preceived as a serious quality control problem.

A method for joining plastic subassemblies or components into a finished fluid handling duct could use known techniques of ultrasonic and friction welding, examples of which are shown in U.S. Pat. Nos. 3,002,871, 4,305,988; and 4,333,978. A further example of a friction welding process for use with a thermoplastic container is disclosed in Japanese Pat. No. 41/16,276. Friction welding is commonly performed by clamping two flat thermoplastic sheets and then reciprocating one sheet with respect to the other. This causes the contacting sheets to rub and to become heated by friction so that the contacting faces melt. These molten areas rigidify and weld when the reciprocation is stopped and the sheets cool. A more detailed explanation of one friction welding technique suitable for closing a channel is included in U.S. Pat. No. 4,377,428, which is incorporated by reference herein.

Two examples of divided channels are disclosed in British Pat. No. 969,959 and in German Offenlegungsschrift No. 2,319,992. Unlike the fluid handling duct of the present invention, these patents disclose unitary ducts having interior and exterior walls either molded without seams or from a single piece of material which is worked into a multi section duct and then welded in one or more locations.

SUMMARY OF THE DISCLOSURE

A fluid handling duct for an automotive vehicle comprises a channel section having a base and integral, upstanding, interior and exterior wall elements and a closure cap which is friction welded to each of the wall elements of the channel section. The cap has one or more generally V-shaped projections depending from its interior surface and extending along and contacted by the upper extremity of each of the walls. The V-shaped projections may be sized such that the wall contacted by any particular V-shaped projection will be deflected in a direction transverse to the longitudinal axis of the duct, which will cause the V-shaped projection and the wall to be held together with a force of deflection having a sufficient magnitude to cause welding of the V-shaped projection relative to the channel section during a friction welding process.

A friction welded air handling duct made in accordance with the present invention may include two or more primary segments lying in generally parallel planes with each of the segments comprising a channel section having a base and upstanding wall elements, and one or more connector segments extending between the primary segments with the connector segments having a base and upstanding wall elements. A single closure cap is friction welded to the wall elements of each of the primary and connector segments. The angle of intersection between the primary connector segments may comprise an obtuse angle.

It is an object of the present invention to produce a multiple conductor fluid handling duct by a process which excludes the use of welding by means of solvents or by electrical resistance heating. These processes are sometimes undesirable because solvents cause disposal problems and welding by means of electrical resistance elements presents process control problems related to the provision of too much or too less heat in the welding zone.

It is a further object of the present invention to provide a multiple conductor fluid handling duct for an automotive vehicle having an aspect ratio or package dimension which is favorable for conducting fluid about the instrument panel of the vehicle.

It is a further object of the present invention to provide a multiple channel fluid handling duct for an automotive vehicle without the use of bolts, rivets or other fasteners which are known to cause problems during the production process.

It is yet a further object of the present invention to provide a friction welded multiple channel fluid handling duct for an automotive vehicle which may have a multi planar configuration adaptable for use with several different instrument panel configurations.

It is yet a further object of the present invention to provide a multiple channel fluid handling duct for an automotive vehicle which has an interior wall element which is friction welded to a closure cap without the need of a fixture for maintaining the interior wall element in contact with the closure cap.

BRIEF DESCRIPTION OF THE DRAWINGS

FIG. 1 also shows a portion of the equipment necessary for producing this duct.

DESCRIPTION OF THE PREFERRED EMBODIMENTS

Figure 1:
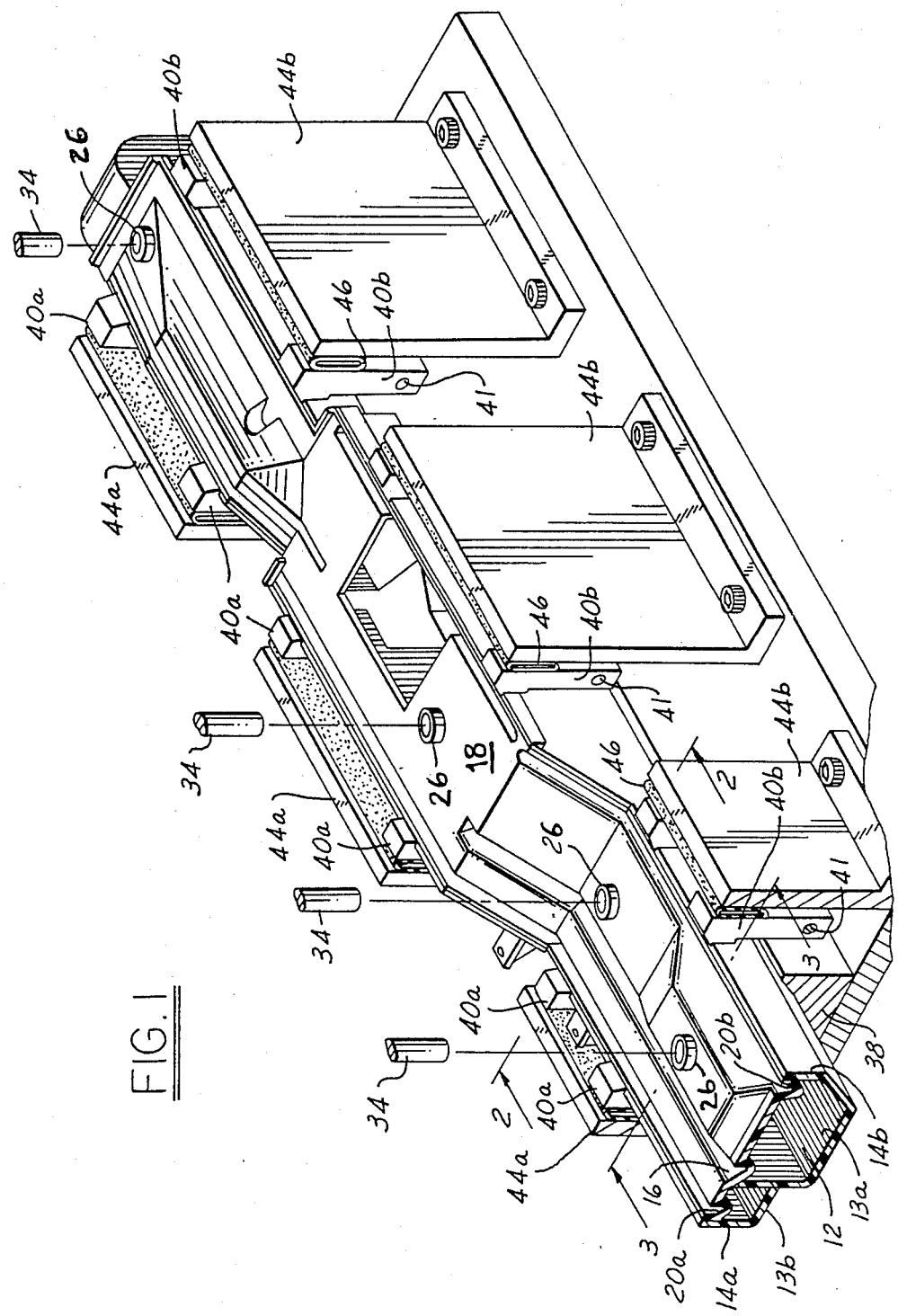
FIG. 1 is a perspective showing a multiple conductor fluid handling duct according to the present invention.

As shown in FIG. 1, the air handling duct of this invention may be assembled using a friction welding technique similar to that disclosed in U.S. Pat. No. 4,377,428, which has previously been incorporated by reference into this specification. This friction welding technique involves the reciprocation of one thermoplastic component with respect to a second component in the presence of a normal force, in order to produce heat by virtue of the rubbing action, which will cause localized melting of the thermoplastic material followed by fusion or welding of the material when the reciprocation has ceased. This friction welding process may be used with various thermoplastic materials such as polyvinyl chloride, polyamide, polyurethane, polystyrene, and polyethylene. In view of this disclosure those skilled in the art will recognize that other thermoplastic materials could be used with the present invention. The friction welding process provides important advantages in that solvent disposal problems and electrical resistance welding problems are obviated. The fluid handling duct disclosed herein has been constructed from polypropylene having a twenty percent talc filling. Those skilled in the art will appreciate, however, that other polypropylene mixtures both with and without talc filling, or with filling by means of other substances may be employed with the present invention. Indeed, those skilled in the art will recognize in view of this disclosure that the present invention may be practiced with materials which are not from the general class termed "thermoplastics".

Figure 3:
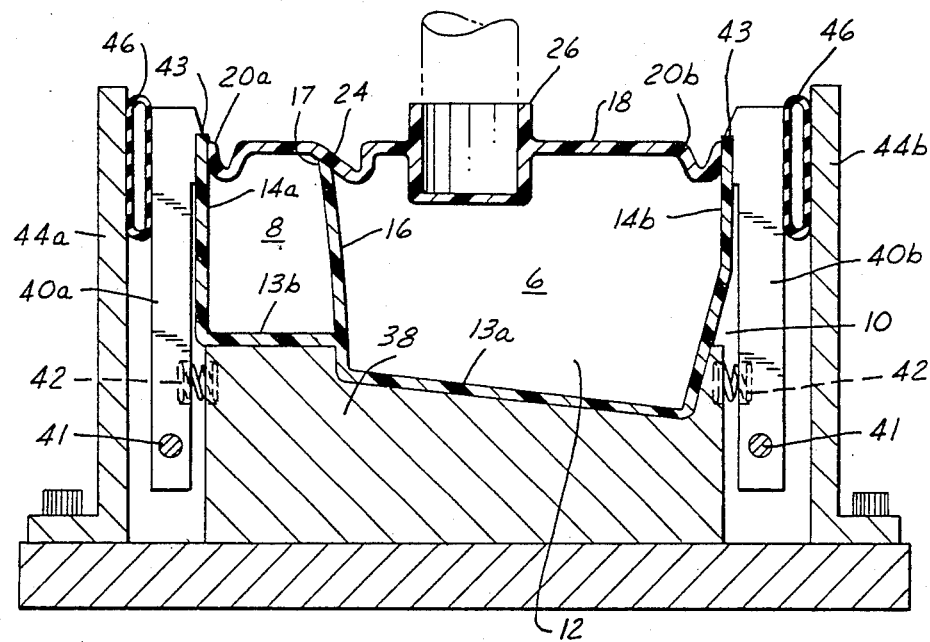
FIG. 3 is a cross section of the multiple connector fluid handling duct and apparatus shown in FIG. 1, taken along the line 3—3 of FIG. 1. This figure shows an internal wall element which has been transversely deflected by a V-shaped projection, so as to permit friction welding of the wall to the projection.
Figure 4:
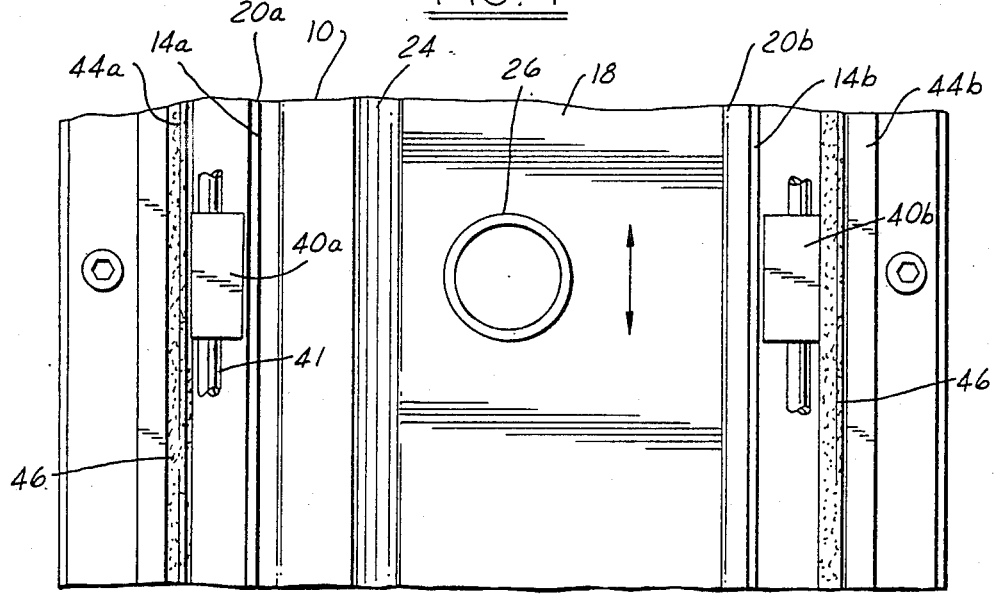
FIG. 4 is a plan view of a portion of the duct of the present invention showing the closure cap and holding fixture depicted in FIG. 1.

As shown in FIGS. 1, 3 and 4, the fixture or equipment for friction welding the multiple conductor fluid handling duct 10 comprises a clamping mechanism for holding channel section 12, and a reciprocating mechanism having pins 34 for reciprocating closure cap 18 with respect to channel section 12. As set forth in detail in U.S. Pat. No. 4,377,428, the channel section is held substantially stationary while closure cap 18 is made to undergo linear reciprocating motion in a direction parallel to longitudinal axis of the channel section. The peak-to-peak displacement is in the order of one to three millimeters at a fixed frequency in the range between 100 to 240 Hertz. After a weld time interval sufficient for the mating surfaces to soften under the influence of friction, the closure cap is returned to its original position and the parts are held in intimate contact by the fixture. After a time sufficient for the mating surfaces to solidify, the force applying means in this case, bellows 46, is deflated and the welded workpiece is removed from the friction welding apparatus. While mounted in the friction welding apparatus, channel section 12 is fixedly held by support base 38 which underlies the channel base sections 13a and 13b. Channel section 12 is further held by a plurality of clamps 40a and 40b which have notches 43 at their upper ends so as to engage the upper extremity of the exterior wall elements 14a and 14b. Notches 43 enable clamps 40a and 40b to lock onto channel section 12, thereby fixing channel section 12 so as to permit closure cap 18 to be reciprocated within channel section 12 in the manner previously described.

Clamps 40a and 40b are held in contact with exterior wall elements 14a and 14b by means of bellows 46 which is inflatable with a fluid such as air and which, when inflated, urges clamps 40a and 40b into contact with exterior wall elements 14a and 14b. Bellows 46 is supported by fixture side walls 44a and 44b. These side walls comprise a fairly rigid support structure for the clamps 40 a and 40b. As best shown in FIGS. 3 and 4, clamps 40a and 40b are pivotable upon pivot pins 41 and the clamps are biased in an outward direction by springs 42 which assure that the clamps 40a and 40b become disengaged from the exterior walls of channel section 12 when bellows 46 is deflated.

As shown in FIGS. 1, 3 and 4, a plurality of cupshaped bosses 26 is provided on the upper surface of closure cap 18. These bosses engage drive pins 34 which are part of the friction welding apparatus and it is through drive pins 34 that the reciprocating motion is imparted to closure cap 18.

As previously noted and as disclosed in U.S. Pat. No. 4,377,428, friction welding has been employed with thermoplastic materials in the past but only in single plane configurations and only where the parts to be welded together could be clamped by discrete clamping means applied during the welding process. This situation may be in contrast to that evidenced in FIG. 3.

Examining FIG. 3 in greater detail, it is seen that a fluid handling duct in accord with the present invention comprises a channel section 12 having a channel base 13a and a channel base 13b, partially defining two separate conductors 6 and 8. Conductor 6 is formed and circumscribed by channel base 13a, exterior wall element 14b, interior wall element 16, and that portion of closure cap 18 including exterior V-shaped projection 20b and a portion of interior V-shaped projection 24. Conductor 8 is formed and circumscribed by channel base 13b, interior wall 16, exterior wall element 14a and that portion of closure cap 18 including exterior V-shaped projection 20a and a shared portion of interior V-shaped projection 24.

Exterior V-shaped projections 20a and 20b assist during the friction welding process by providing a force of deflection against exterior wall elements 14a and 14b respectively. Thus, clamps 40a and 40b generally position and maintain exterior wall elements 14a and 14b in contact with the exterior V-shaped projections, but the unique V-shape of these projections allows a deflection in a transverse, inward direction which assists in the maintenance of good rubbing contact between walls 14a and 14b and V-shaped projections 20a and 20b, so as to promote the friction welding process.

The interaction of interior wall element 16 and interior V-shaped projection 24 is somewhat different than the interaction between the other V-shaped projections and the exterior wall elements. As can be seen from FIG. 3, interior wall element 16 is biased in the direction of exterior wall element 14a. This bias is caused by the action of interior V-shaped projection 24, which transversely deflects the upper extremity, 17, of interior wall element 16. This deflection of interior wall element 16 by interior V-shaped projection 24 causes a force buildup between the interior V-shaped projection and the interior wall element. This force buildup in turn causes the V-shaped projection and interior wall element to be pushed together so that welding will occur along the interface of the upper extremity of the interior wall, 17, and the interior V-shaped projection, even in the absence of any additional clamping mechanism. In other words, V-shape projection 24 and interior wall element 16 are self-clamping. Accordingly, welding of the interior wall element and the interior V-shaped projection will occur when the closure cap is reciprocated in the direction shown in FIG. 4. At the same time welding will occur between the exterior wall elements 14a and 14b and the exterior V-shaped projections 20a and 20b. The multiple channel fluid handling duct of the present invention is thus assembled without the use of bolts, rivets or other fasteners which are known to cause problems during the production Process. Further, the channel shown has a favorable aspect ratio or package dimension for use in automotive vehicles because its relatively flat configuration is easily combinable into the instrument panel structure of vehicles.

Figure 2:
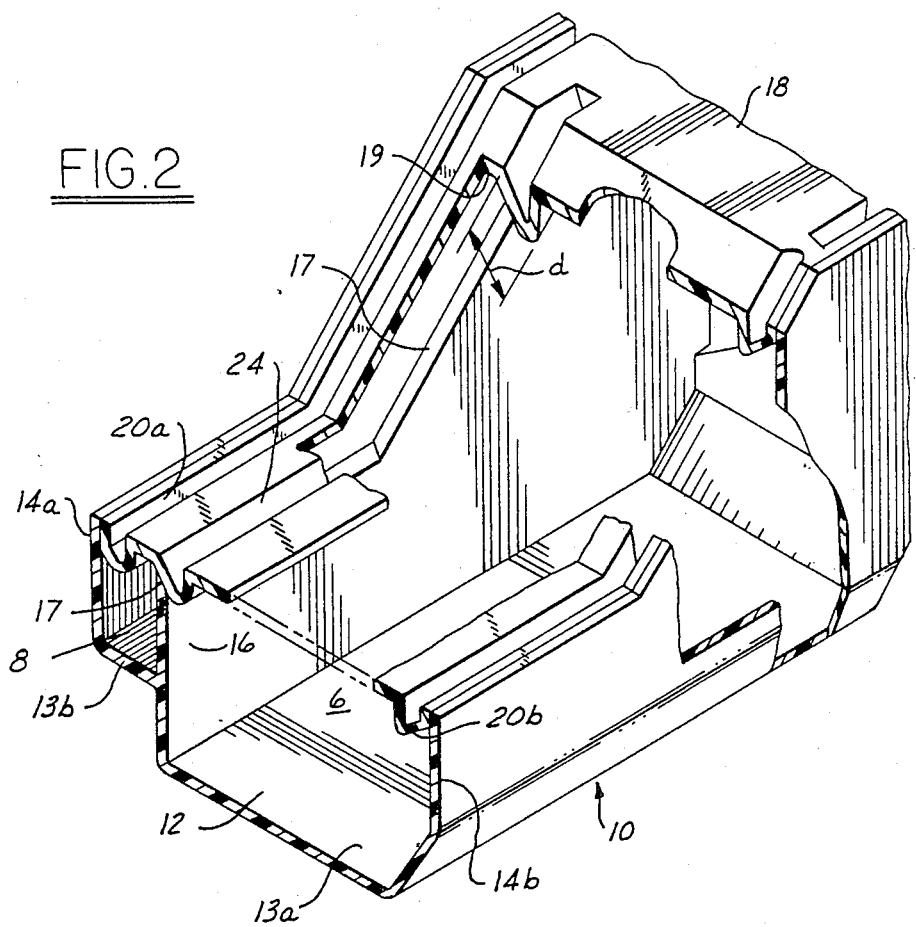
FIG. 2 is a perspective generally taken along the line 2—2 of FIG. 1 and partially cut away to show the interior details of construction of the connector section lying between two primary segments of the multiple conductor fluid handling duct.

The previously described interaction between interior wall element 16 and interior V-shaped projection 24 is particularly important in terms of the connector segment illustrated in FIG. 2. The connector segment functions as a transition between the parallel, primary segments.

The interior V-shaped projection of the connector segment is made of sufficient depth, d, and interior wall element 16 is dimensioned such that sufficient clearance exists between the interior surface, 19, of closure cap 18 adjoining the interior V-shaped projection and the upper extremity, 17, of interior wall element 16, that the linear reciprocation needed for the friction welding process will be possible even though closure cap 18 and channel section 12 are moved in a direction not completely parallel to each other, but in a direction which is at least partially normal to each other. Those skilled in the art will appreciate in view of this disclosure that it is thus possible to make a friction welded duct having two or more primary segments lying in generally parallel, offset planes and one or more connector segments extending between the primary segments, at an obtuse angle thereto, with each of the connector segments constructed as illustrated in FIG. 2. Those skilled in the art will thus appreciate that it is possible to make a friction welded duct having a one or more primary segments which are welded by linear reciprocating motion and in which the component parts are reciprocated in a direction parallel to each other and one or more connector segments in which the components of the duct are reciprocated in a direction which is not completely parallel to the lines of intersection of the wall elements and V-shaped projections. An important feature of the present invention is that the relative linear reciprocating motion required by the friction welding process need not be directed along an axis parallel to the longitudinal axis of the duct because the V-shaped projections of the closure cap allow even non-parallel linear reciprocating motion, i.e., motion produced in the area of the connector segments, to cause the desired welding effect.

While there have been described and illustrated preferred embodiments of the present invention, it will be apparent to those skilled in the art that further and still other variations and modifications may be made to the described method, device, and article without deviating from the scope of the invention, which is limited only by the scope of the appended claims.

We claim:

1. A friction welded fluid handling duct for an automotive vehicle comprising:
   two or more primary segments, with each having a longitudinal axis, with said segments lying in generally parallel, offset planes with each of said segments comprising a channel section having a base and upstanding wall elements;
   one or more connector segments extending between said primary segments with each of said connector segments having a base and upstanding wall elements; and
   a unitary cap which is friction welded to said wall elements.

2. The fluid handling duct according to claim 1 wherein said primary and connector segments each comprise a base, two exterior wall elements, and one or more interior wall elements.

3. The fluid handling duct according to claim 1 wherein the included angle of intersection between said primary and connector segments is an obtuse angle.

4. The fluid handling duct according to claim 1 wherein said unitary cap has one or more generally V-shaped projections depending therefrom and extending along each of said wall elements and contacted by the upper extremity of each of said wall elements.

5. The fluid handling duct according to claim 4 wherein each of said V-shaped projections is sized such that the wall contacted by each of said V-shaped projections will be deflected in a direction transverse to the longitudinal axis of said duct, whereby said V-shaped projection and said wall will be held together with a force of deflection having sufficient magnitude to cause welding of said V-shaped projection to said wall when said closure cap is moved relative to said channel section during said friction welding.

* * * * *